(12) United States Patent
Nishijima

(10) Patent No.: US 9,685,875 B2
(45) Date of Patent: Jun. 20, 2017

(54) SWITCHING POWER SUPPLY

(71) Applicant: Fuji Electric Co., Ltd., Kanagawa (JP)

(72) Inventor: Kenichi Nishijima, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/177,634

(22) Filed: Jun. 9, 2016

(65) Prior Publication Data

US 2017/0012542 A1 Jan. 12, 2017

(30) Foreign Application Priority Data

Jul. 10, 2015 (JP) ................................. 2015-138503

(51) Int. Cl.
*H02M 3/335* (2006.01)
*H02M 1/00* (2006.01)

(52) U.S. Cl.
CPC ... *H02M 3/33523* (2013.01); *H02M 3/33507* (2013.01); *H02M 2001/0009* (2013.01); *H02M 2001/0032* (2013.01)

(58) Field of Classification Search
CPC . H02M 2001/0032; H02M 2001/0035; H02M 2001/0054; H02M 2001/0048; H02M 3/33507; H02M 3/3353; H02M 3/33569
USPC ......... 363/21.04, 21.05, 21.09–21.13, 21.17, 363/21.18
See application file for complete search history.

(56) References Cited

U.S. PATENT DOCUMENTS

| 5,973,939 A * | 10/1999 | Tan | H02M 3/33569 363/131 |
| 2007/0279945 A1* | 12/2007 | Salato | H02M 1/08 363/21.14 |
| 2009/0262559 A1* | 10/2009 | Kaneko | H01L 27/098 363/21.04 |
| 2012/0300506 A1* | 11/2012 | Lee | H02M 3/33507 363/21.13 |

(Continued)

FOREIGN PATENT DOCUMENTS

| JP | 2002-252973 A | 9/2002 |
| JP | 2005-295662 A | 10/2005 |
| JP | 2013-164783 A | 8/2013 |

*Primary Examiner* — Adolf Berhane
*Assistant Examiner* — Gary Nash
(74) *Attorney, Agent, or Firm* — Chen Yoshimura LLP

(57) ABSTRACT

A switching power supply includes a main switching element that is connected to a primary coil of a transformer and switches a main current ON/OFF, and a secondary switching element connected in parallel to the main switching element and that has a lower power capacity than the main switching element. The switching power supply also includes a control circuit that controls these switching elements. The control circuit includes: a main driver circuit that generates, in accordance with a control signal generated according to an output voltage from a secondary coil of the transformer, a main drive signal for switching the main switching element ON/OFF; a secondary driver circuit that generates a secondary drive signal for switching the secondary switching element ON/OFF according to the control signal; and an enable control circuit that deactivates the main driver circuit when a power consumption of a load is less than a threshold value.

7 Claims, 8 Drawing Sheets

(56) References Cited

U.S. PATENT DOCUMENTS

| | | | | |
|---|---|---|---|---|
| 2013/0063985 A1* | 3/2013 | Ye | ............................ | H02M 1/38 |
| | | | | 363/21.05 |
| 2013/0235623 A1* | 9/2013 | Huang | .................. | H02M 3/156 |
| | | | | 363/21.17 |
| 2014/0146576 A1* | 5/2014 | Yang | ................. | H02M 3/33569 |
| | | | | 363/21.02 |

\* cited by examiner

Vg Waveform during Continuous Switching

Frequency Reduction (Applied during Primary Side Regulation)

Frequency Reduction + Burst Control (Applied during Secondary Side Regulation)

Switching Loss A: Burst Switching Operation Example
(tburst = 200ms, tsw-on = 0.28ms
0.04ms x 7, fsw = 8 pulses at 25kHz)

Switching Loss B: Continuous Switching Operation Example (fsw = 1kHz)

SWITCHING POWER SUPPLY

BACKGROUND OF THE INVENTION

Technical Field

The present invention relates to a switching power supply that has a simple configuration and makes it possible to reduce switching loss in a switching element as well as reduce power consumption while in a standby mode.

Background Art

One example of a switching power supply that can provide a rated power capacity on the order of several dozen watts is the flyback power switching circuit illustrated in FIG. 4. This type of switching power supply includes a diode bridge circuit DB that full-wave rectifies AC power supplied from a commercial 100V or 220V AC power source on the input side of the power switching circuit and an input capacitor Cin that smooths the output from the diode bridge circuit DB.

As illustrated in FIG. 4, an AC power input line arranged upstream of the diode bridge circuit DB includes first and second noise filters NF1 and NF2 as well as a capacitor Cx in order to prevent high frequency conductive noise (electromagnetic interference (EMI)) generated during operation of the switching power supply from leaking back to the AC power input line side. Moreover, a resistor Rx is connected in parallel to the capacitor Cx in order to discharge the charge stored in the capacitor Cx when the power source is shut off.

The device main body (the power switching circuit) 1 that forms the main portion of the switching power supply includes a switching element Q that is connected to the diode bridge circuit DB via a primary coil Ta of a transformer T and is switched ON and OFF to control the current that flows through the primary coil Ta. This switching element Q is constituted by a high power capacity MOSFET selected according to the desired power capacity rating for the switching power supply, for example. The device main body 1 further includes a diode D that rectifies an alternating voltage induced in a secondary coil Tb of the transformer T as the switching element Q is switched ON and OFF and an output capacitor Cout that smooths the rectified output from the diode D. Together, the diode D and the output capacitor Cout form a voltage output circuit that generates a prescribed output voltage Vout.

A control circuit 2 integrated as part of a power supply IC switches the switching element Q ON and OFF according to a feedback signal from an output voltage detection circuit 3 that detects the output voltage Vout, for example. The output voltage detection circuit 3 divides and detects the output voltage Vout via voltage-dividing resistors Ra and Rb that are connected in series and includes a shunt regulator SR that calculates the voltage difference between the detected output voltage Vout and a predetermined reference voltage that defines a target output voltage, for example.

Furthermore, the output voltage detection circuit 3 feeds the voltage difference obtained by the shunt regulator SR back into the control circuit 2 as the feedback signal via a photocoupler PC, for example. The control circuit 2 then feedback-controls the pulse width (ON time) of a drive signal that turns the switching element Q ON and OFF according to the received feedback signal, thereby regulating the output voltage Vout to the target output voltage, for example.

The control circuit 2 includes a voltage-controlled oscillator in which the oscillating frequency is controlled by a control voltage. This voltage-controlled oscillator generates a triangle wave signal using the charges and discharges of a built-in capacitor and also generates a rectangular wave signal that is synchronized with the triangle wave signal. The control circuit 2 also includes a pulse-width modulation (PWM) control comparator that compares the voltage of the triangle wave signal generated by the oscillator to the voltage $V_{FB}$ of the feedback signal in order to generate a control signal having a pulse width that defines the ON time Ton of the switching element Q. The control signal output from the comparator is input to a driver circuit arranged on the output side of the control circuit 2. This driver circuit then generates and outputs the drive signal that turns the switching element Q ON and OFF.

This type of output voltage Vout control scheme is widely used in switching power supplies in the 10 to 90 W class in which the output voltage Vout is 12V, 19V, or 32V and is typically known as a secondary-side regulated scheme. Meanwhile, in switching power supplies in the 10W class in which the output voltage Vout is 5V and the output current is less than or equal to 2A, a so-called primary-side regulated scheme (not illustrated in the any of the figures here) in which the output voltage Vout is regulated according to a voltage induced in an auxiliary coil of the transformer T is more commonly used.

The control circuit 2 controls the switching frequency fsw of the switching element Q according to the voltage $V_{FB}$ of the feedback signal, which changes according to the magnitude of the load on the switching power supply. This makes it possible to implement a frequency control scheme that reduces the switching loss in the switching element Q. As is described in detail in Patent Document 1, for example, in this type of frequency control scheme, the switching frequency fsw of the switching element Q is typically decreased in accordance with the voltage $V_{FB}$ of the feedback signal when that voltage $V_{FB}$ becomes less than a prescribed threshold value.

More specifically, as illustrated in FIGS. 5A and 5B, for example, in this type of frequency control scheme the switching frequency fsw is reduced in accordance with decreases in the voltage $V_{FB}$ within a range defined by a maximum switching frequency fsw-max (such as 65 kHz) for when a maximum load is applied and a minimum switching frequency fsw-min (such as 25 kHz) for when a light load is applied. Furthermore, when the load power (the voltage $V_{FB}$) decreases even further, the switching frequency fsw is reduced to a frequency less than the minimum switching frequency fsw-min such as approximately 0.5 kHz in order to further reduce switching loss in the switching element Q, for example. This type of switching frequency reduction control scheme makes it possible to implement a so-called standby mode in which the resulting reduction in power consumption is maximized. Moreover, this type of frequency reduction control is used widely but exclusively as part of the abovementioned primary-side regulated control schemes.

Furthermore, Patent Document 2 discloses a so-called burst switching control scheme. As illustrated in FIGS. 6A and 6B, for example, in this type of control scheme the additional reduction in the switching frequency fsw while transitioning to standby mode is replaced by an intermittent burst switching drive scheme in which the switching element Q is turned ON and OFF at a prescribed frequency in order to achieve the desired reduction in power consumption in standby mode. This type of burst switching control scheme is widely used in secondary-side regulated switching power supplies.

Moreover, although this is not directly related to the main aspects of the present invention, Patent Document 3 discloses switching a plurality of FETs that are connected in parallel ON in order under prescribed operating conditions and in accordance with load-dependent output currents from a plurality of power supply circuits (more specifically, in accordance with increases in the output currents) in order to balance the load between the power supply circuits. However, in the technology disclosed in Patent Document 3, the plurality of FETs are simply being used as a current output switch. Furthermore, connecting a plurality of switching elements Q that each have a prescribed power capacity together in parallel in order to achieve the desired power capacity rating for the overall switching power supply is a conventionally well-known and widely used technique.

RELATED ART DOCUMENTS

Patent Documents

Patent Document 1: Japanese Patent Application Laid-Open Publication No. 2002-252973
Patent Document 2: Japanese Patent Application Laid-Open Publication No. 2005-295662
Patent Document 3: Japanese Patent Application Laid-Open Publication No. 2013-164783

SUMMARY OF THE INVENTION

As described above, conventional methods for reducing loss in switching power supplies while in standby mode include reducing the switching frequency fsw to a value less than the value used in the normal operation mode (frequency reduction control) and intermittently switching the switching element Q ON and OFF at a prescribed interval and for a prescribed period of time (burst switching control). However, if a FET having a power capacity that satisfies the desired power capacity rating for the switching power supply is used for the switching element Q, the switching loss in the FET during standby mode cannot be ignored. This switching loss is caused entirely by the output capacitance Coss and the gate charge Qg of the FET device, which are determined by the structure of the device.

FIG. 7 shows an example of the performance of a general-purpose MOSFET in the 600V class. More specifically, FIG. 7 shows the relationship between the rated current Id and the resulting output capacitance Coss and gate charge Qg. Moreover, FIG. 8 provides a comparison of the switching loss B that occurs in the abovementioned general-purpose MOSFET (the switching element Q) when operated using a continuous switching scheme with a switching frequency fsw of 1 kHz during standby mode and the switching loss A that occurs when the switching element Q is operated using a burst switching scheme with a switching frequency fsw of 25 kHz during standby mode. In the burst switching drive scheme for the switching element Q, the burst period tburst was set to 200 ms, the burst switching time tsw-on was set to 0.28 ms, and the switching frequency fsw was set to 25 kHz.

The switching loss A that occurs when the switching element Q is operated using the burst switching scheme is given by:

$$A = (1/2) \times Coss \times Vds^2 \times fsw \times (tsw\text{-on}/tburst) + Vdd \times Qg \times fsw \times (tsw\text{-on}/tburst)$$

Moreover, the switching loss B that occurs when the switching element Q is operated using the continuous switching scheme can be calculated by setting tsw-on=tburst in the equation above because in this case, the switching off time tsw-off of the switching element Q is equal to 0.

As shown by the example calculations for the switching losses A and B in FIG. 8, for a switching element Q (MOSFET) with a drain current Id of 10A (which might be used in a switching power supply with an output voltage Vout of 19V and a power capacity rating of 65 W, for example), the output capacitance Coss and the gate charge Qg are relatively large, at approximately 150 pF and 50 nC respectively. As a result, the switching loss that occurs when using the continuous switching scheme during standby mode is also large, at 15 mW. A switching loss of this magnitude would represent a significant problem when attempting to design a switching power supply that keeps power consumption less than or equal to 30 mW during standby mode, for example.

The present invention was made in light of the foregoing and aims to provide a switching power supply that has a simple configuration and makes it possible to reduce loss in a switching element as well as reduce power consumption while in standby mode.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply, including:
a main switching element, configured to be attached to a primary coil of a transformer so as to switch a main current that flows in the primary coil ON and OFF;
a control circuit that controls switching the main switching element ON and OFF according to an output voltage obtained via a secondary coil of the transformer; and
a secondary switching element that has a lower power capacity than the main switching element, the secondary switching element being connected in parallel to the main switching element and being switched ON and OFF by the control circuit.

The control circuit includes:
a main driver circuit that generates, based upon the output voltage, a main drive signal for switching the main switching element ON and OFF;
a secondary driver circuit that generates a secondary drive signal for switching the secondary switching element ON and OFF based upon the output voltage; and
an enable control circuit that activates the main driver circuit when a power consumption of a load to which the output voltage is supplied exceeds a predetermined threshold value and that deactivates the main driver circuit when the power consumption is less than the threshold value, thereby putting the switching power supply into a standby mode.

It is preferable that the switching power supply be configured such that the secondary driver circuit is arranged upstream of the main driver circuit and constantly generates the secondary drive signal based on a control signal generated from the output voltage, and such that the main driver circuit generates the main drive signal according to the secondary drive signal generated by the secondary driver circuit.

Alternatively, the main driver circuit and the secondary driver circuit may be arranged in parallel and may respectively generate the main drive signal and the secondary drive signal based on the control signal generated in accordance with the output voltage.

The main switching element is a high power capacity power MOSFET that satisfies a prescribed power capacity, and the secondary switching element is a MOSFET with a lower power capacity than the main switching element. More specifically, the secondary switching element may be integrated into the control circuit.

The control circuit may be configured to include a switching frequency control unit that, when the power consumption of the load decreases, reduces a switching frequency at which the main switching element and the secondary switching element are switched ON and OFF from a maximum switching frequency to a minimum switching frequency in accordance with the decrease in the power consumption of the load, and when the power consumption of the load becomes less than the threshold value while the main switching element is being continuously switched at the minimum switching frequency, the switching frequency control unit further reduces the switching frequency of the secondary switching element to a value less than the minimum switching frequency.

Alternatively, the control circuit may be configured to include:

a switching frequency control unit that, when the power consumption of the load decreases, reduces a switching frequency at which the main switching element and the secondary switching element are switched ON and OFF from a maximum switching frequency to a minimum switching frequency in accordance with the decrease in the power consumption of the load; and a burst drive control unit that starts driving the secondary switching element using a burst switching scheme at a prescribed burst frequency when the power consumption of the load becomes less than the threshold value while the main switching element is being continuously switched at the minimum switching frequency.

Moreover, the secondary driver circuit is constantly active, and the enable control circuit activates the main driver circuit by forwarding an enable signal to the main driver circuit. In other words, the enable signal is used to deactivate the main driver circuit when the power consumption of the load is less than the predetermined threshold value. The threshold value that is used to make determinations about the power consumption of the load is used to enable a standby mode, in which just the secondary switching element is switched ON and OFF in order to reduce power consumption during light loading.

In the switching power supply configured as described above, during normal operation mode the main switching element is switched ON and OFF at a switching frequency fsw set according to the power consumption of the load (load power), and therefore the output voltage Vout is controlled to remain stable at a fixed value. Moreover, when the load power decreases to the point at which standby mode is activated and the switching frequency fsw is reduced further or burst switching control is enabled, the main driver circuit is deactivated as soon as the enable signal is terminated. As a result, the main switching element (which supplies the main power to the load) stops being switched ON and OFF, and only the secondary switching element (which has a lower power capacity) continues to be switched ON and OFF.

This makes it possible to significantly reduce switching loss in the secondary switching element (which has a lower power capacity than the main switching element) by an amount proportional to the relatively small output capacitance Coss and gate charge Qg of the secondary switching element. Using a MOSFET with a drain current Id of less than or equal to 1A for the secondary switching element, for example, makes it possible to reduce switching loss in standby mode to less than or equal to 2 mW even when the secondary switching element is driven using a continuous switching scheme.

Moreover, to achieve this configuration, a low power capacity secondary switching element that can provide sufficient switching power in standby mode (such as approximately 600V/10 mA) simply has to be selected appropriately (as opposed to the main switching element, which is selected in order to satisfy the required overall power capacity rating (such as approximately 600V/10 mA)). This makes it possible to easily integrate the secondary switching element into the control circuit. Furthermore, the main driver circuit and the secondary driver circuit are typically implemented using a multi-stage configuration in the control circuit that includes a plurality of amplifiers and in which the further downstream amplifier is the main driver circuit and the upstream amplifier is the secondary driver circuit. This prevents the overall configuration from becoming needlessly complex.

In addition, the main driver circuit only has to be controlled according to the enable signal, which is generated according to whether the power consumption of the load exceeds the predetermined threshold value. This makes it possible to continue to effectively utilize the basic features of conventional switching power supply control circuits as-is while also making it possible to effectively reduce switching loss in standby mode. Therefore, the present invention exhibits a variety of advantageous effects, such as making it possible to provide a simple switching power supply that effectively reduces power consumption in standby mode.

It is to be understood that both the foregoing general description and the following detailed description are exemplary and explanatory, and are intended to provide further explanation of the invention as claimed.

DETAILED DESCRIPTION OF EMBODIMENTS

Next, a switching power supply according to an embodiment of the present invention will be described with reference to figures. The present invention is suitable for application to a switching power supply with a power capacity rating on the order of several dozen watts, for example.

Figure 4:
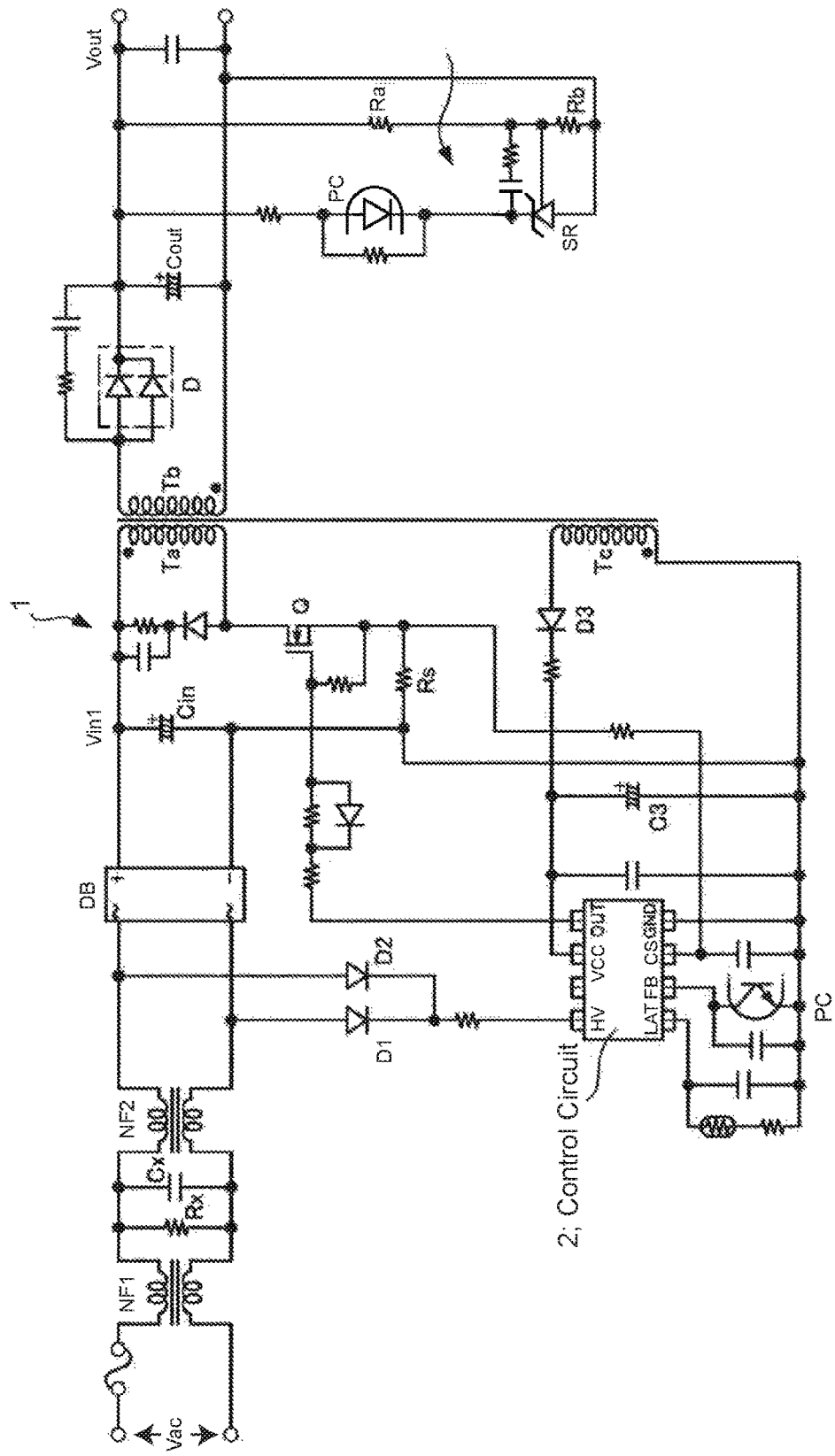
FIG. 4 illustrates an example of a configuration of a conventional switching power supply.
Figure 5A:
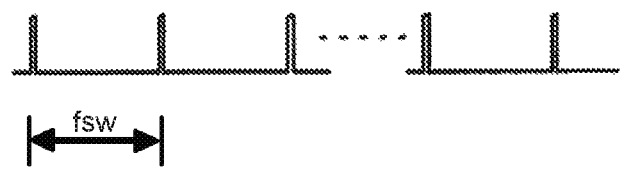
FIGS. 5A and 5B illustrate an example of a switching element drive signal waveform for use in a continuous switching scheme as well as an example of a frequency reduction control scheme in which switching frequency is controlled according to the voltage of a feedback signal that corresponds to the power consumption of a load.
Figure 5B:
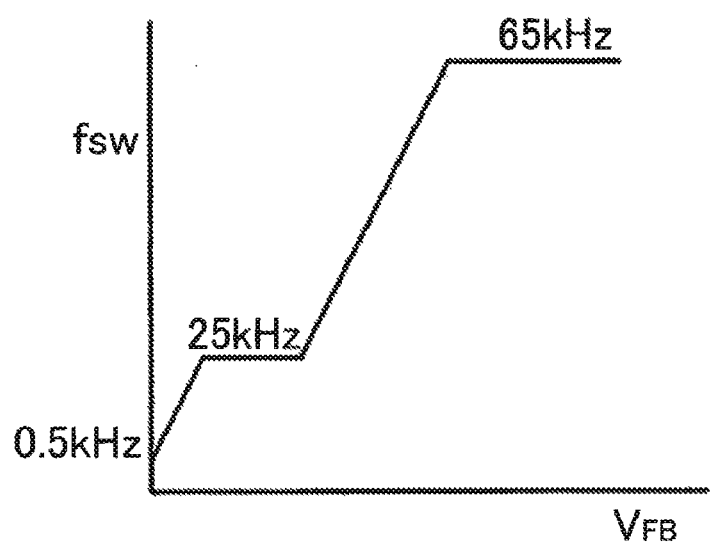
Figure 6A:
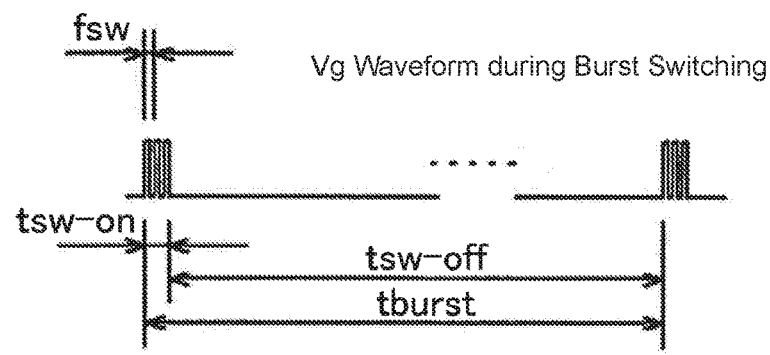
FIGS. 6A and 6B illustrate an example of a switching element drive signal waveform for use in a burst switching scheme as well as an example of a combined frequency reduction and burst switching control scheme in which switching frequency is controlled according to the voltage of a feedback signal that corresponds to the power consumption of a load.
Figure 6B:
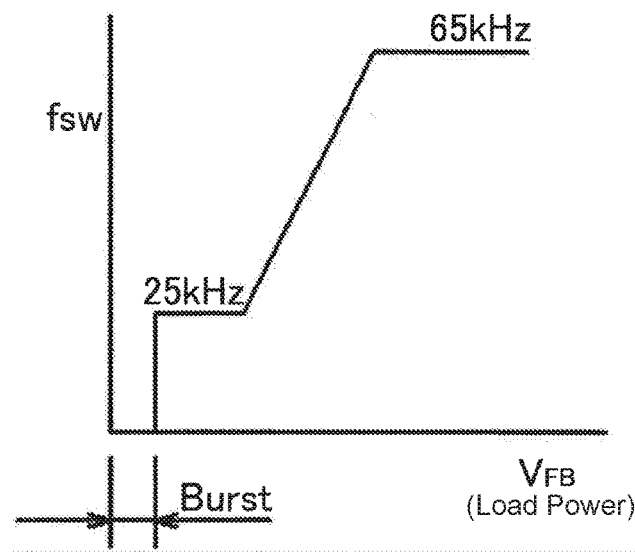
Figure 7:
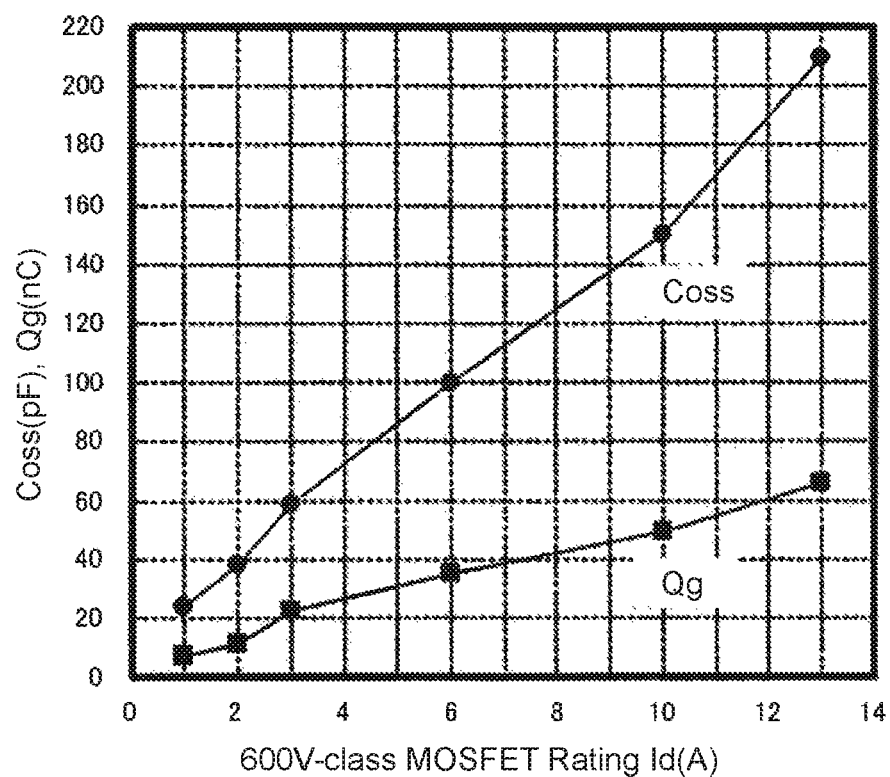
FIG. 7 is a graph showing an example of the rated performance of a general-purpose MOSFET of the 600V class.
Figure 8:
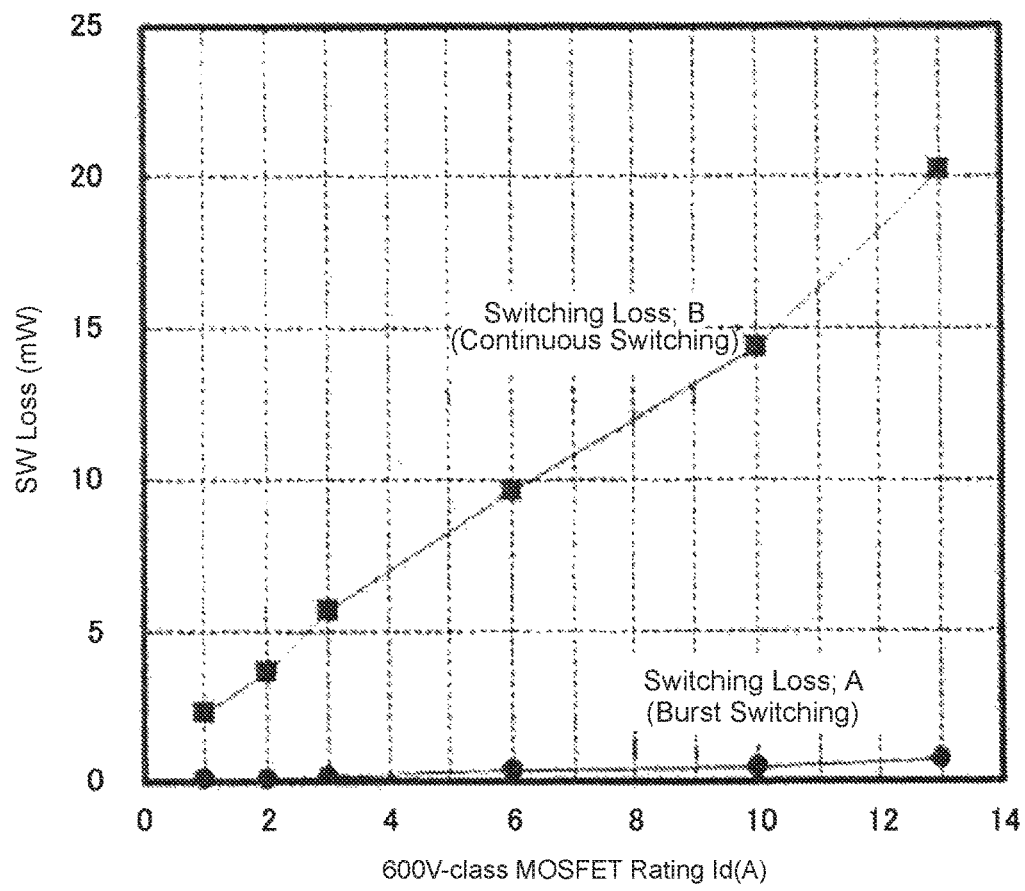
FIG. 8 is a graph showing a comparison of the switching losses associated with a continuous switching scheme and a burst switching scheme.

The switching power supply according to this embodiment of the present invention is substantially constituted by a secondary-side regulated flyback power supply device such as that illustrated in FIG. 4, for example. More specifically, as shown in the schematic illustrations of the main components of the configurations in FIGS. 1 and 2, the switching power supply includes a switching element Q that is connected in series to a primary coil Ta of a transformer T and is used as a main switching element Q-m for supplying power to a load (not illustrated in the figure) and a secondary switching element Q-s that is connected in parallel to the main switching element Q-m.

The main switching element Q-m is a high power capacity power MOSFET that satisfies the required power capacity rating for the load, and the secondary switching element Q-s is a MOSFET with a lower power capacity than the main switching element Q-m. More specifically, the main switching element Q-m is a high power capacity power MOSFET of the 600V class and has a maximum drain current Id of approximately 10A. The secondary switching element Q-s is a low power capacity MOSFET of the 600V class and has a maximum drain current Id of approximately 10 mA.

Moreover, a control circuit 2 includes a main driver circuit Drv-m that generates a main drive signal that turns the main switching element Q-m ON and OFF according to a prescribed control signal and a secondary driver circuit Drv-s that generates a secondary drive signal that turns the secondary switching element Q-s ON and OFF according to the prescribed control signal. The main driver circuit Drv-m and the secondary driver circuit Drv-s are typically configured using a multi-stage output circuit that includes a plurality of cascade-connected amplifiers that are integrated as part of the control circuit 2, for example. The further downstream amplifier is the main driver circuit, and the upstream amplifier is the secondary driver circuit.

The present embodiment also includes an enable control circuit 10 that compares a voltage $V_{FB}$ of a feedback signal that indicates an output voltage Vout and is fed back into the control circuit 2 to a threshold voltage $V_{standby}$ used for enabling standby mode in order to generate an enable signal EN, for example. When the voltage $V_{FB}$ of the feedback signal is greater than the threshold voltage $V_{standby}$, the enable control circuit 10 sets the enable signal EN to [H], thereby allowing the main driver circuit Drv-m to generate and output the main drive signal. Moreover, when the voltage $V_{FB}$ of the feedback signal is less than the threshold voltage $V_{standby}$, the enable control circuit 10 sets the enable signal EN to [L], thereby preventing the main driver circuit Drv-m from generating and outputting the main drive signal.

As a result, the main switching element Q-m receives the main drive signal generated and output by the main driver circuit Drv-m and switches ON and OFF only during a normal operation mode in which the voltage $V_{FB}$ of the feedback signal is greater than the threshold voltage $V_{standby}$. In other words, when the voltage $V_{FB}$ of the feedback signal becomes less than the threshold voltage $V_{standby}$ and a transition to standby mode is therefore detected, the main driver circuit Drv-m stops generating and outputting the main drive signal, thereby causing the main switching element Q-m to stop switching ON and OFF.

Meanwhile, the secondary switching element Q-s switches ON and OFF upon receiving the secondary drive signal generated and output by the secondary driver circuit Drv-s. The secondary driver circuit Drv-s regularly generates the secondary drive signal upon receiving the control signal, which is generated according to the voltage $V_{FB}$ of the feedback signal. Moreover, the secondary drive signal generated by the secondary driver circuit Drv-s is input to the main driver circuit Drv-m as a control signal for making the main driver circuit Drv-m generate the main drive signal.

Figure 1:
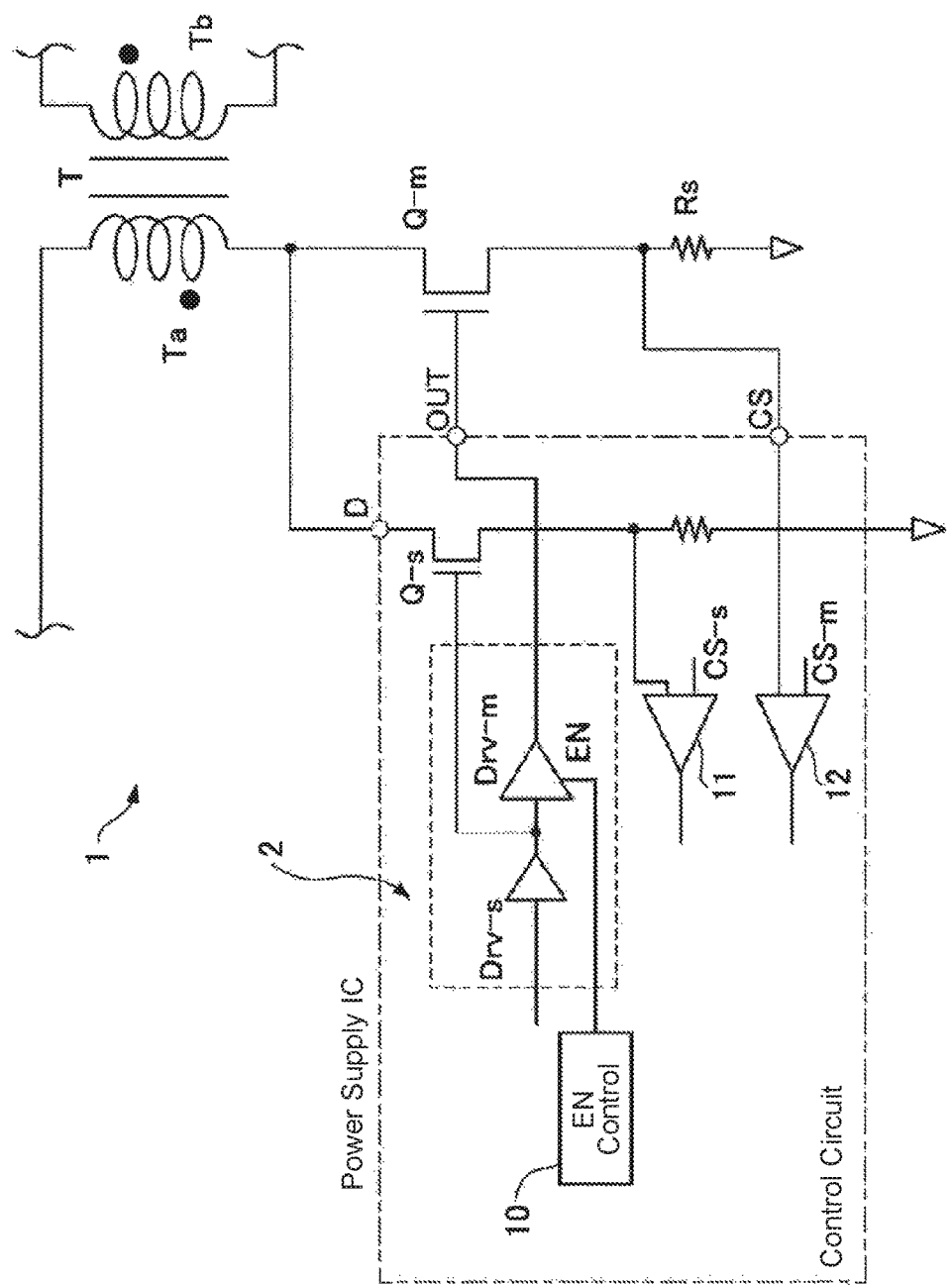
FIG. 1 schematically illustrates a configuration of the main components of a switching power supply according to an embodiment of the present invention.
Figure 2:
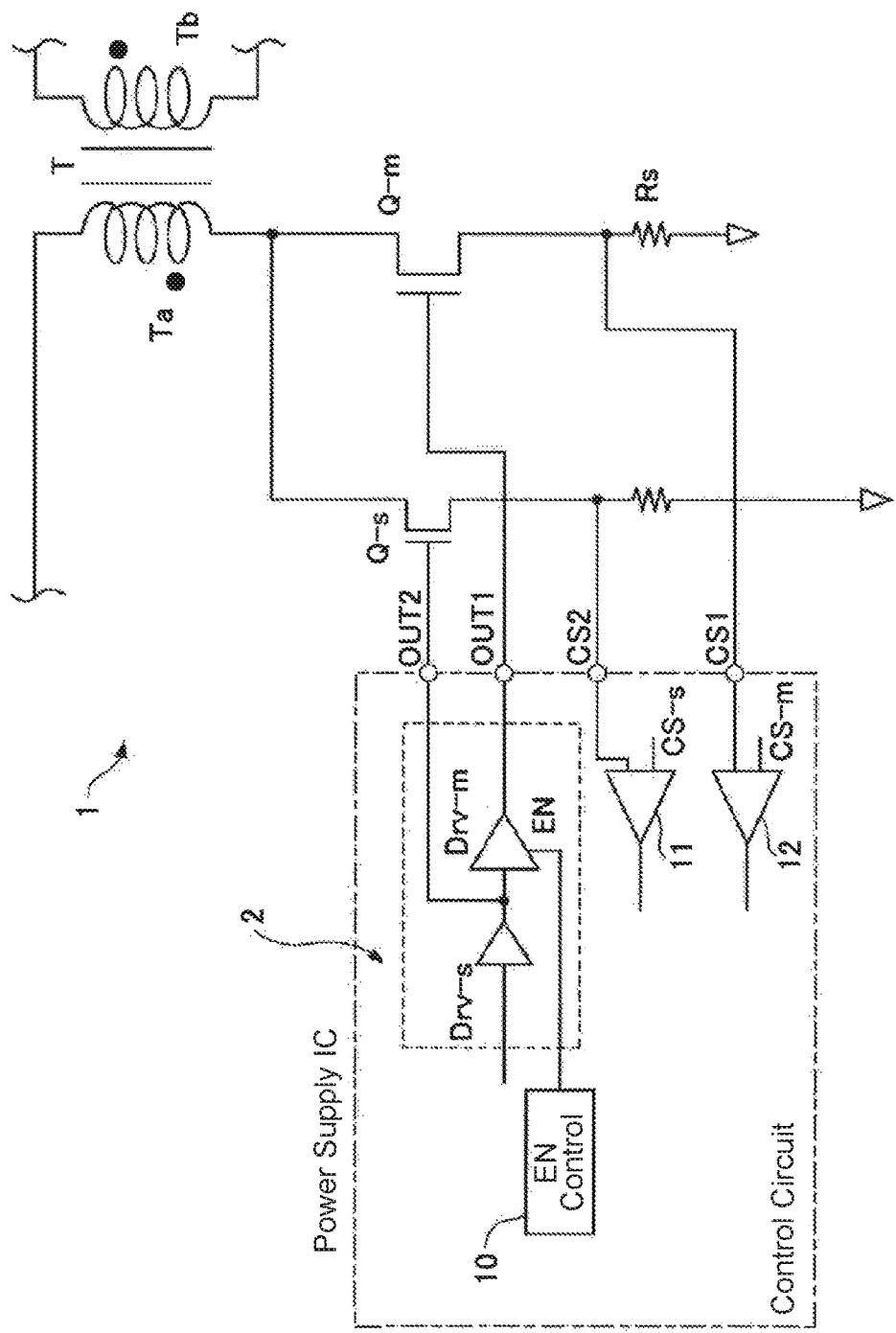
FIG. 2 schematically illustrates a configuration of the main components of a switching power supply according to another embodiment of the present invention.

Furthermore, the comparators 11 and 12 that are labeled with the reference characters CS-m and CS-s in FIGS. 1 and 2 form an overcurrent detection circuit that detects overcurrents flowing through the main switching element Q-m and the secondary switching element Q-s from the respective drain currents flowing through the main switching element Q-m and the secondary switching element Q-s.

Here, the low power capacity MOSFET that is used as the secondary switching element Q-s may be integrated into the control circuit 2 which is implemented as a power supply IC. As illustrated in FIG. 2, however, the switching power supply may also be configured with the secondary switching element Q-s provided outside of the control circuit 2 along with the main switching element Q-m. Moreover, although this embodiment of the present invention was described using an example of a switching power supply configured as illustrated in FIG. 4, the present invention is also applicable to either a primary-side regulated or a secondary-side regulated switching power supply as well as to either a flyback or a forward switching power supply.

Figure 3:
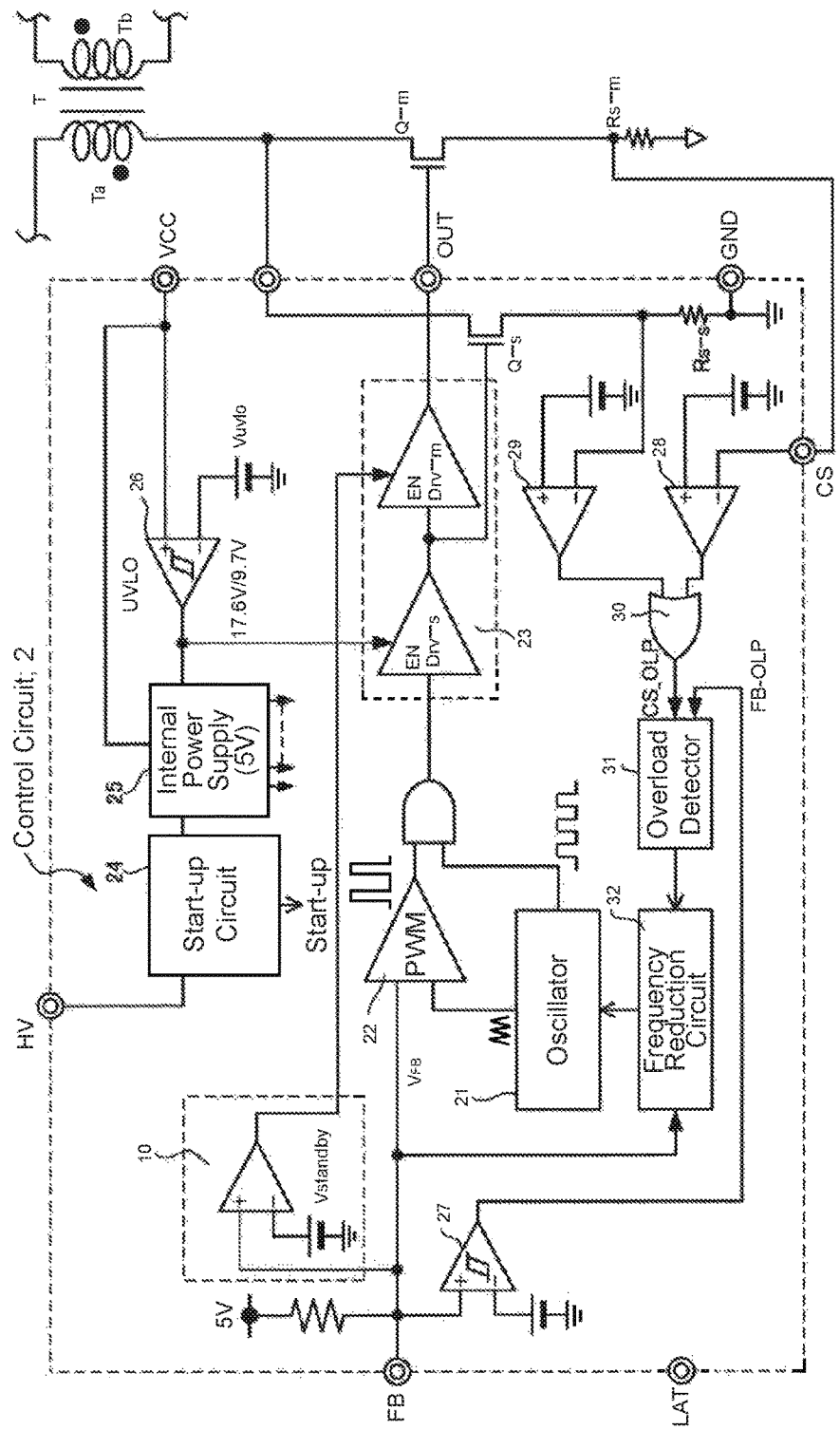
FIG. 3 illustrates an example of a configuration of a control circuit for the switching power supply illustrated in FIG. 1.

Next, the control circuit 2 that is implemented as a power supply IC will be described in more detail. As illustrated in FIG. 3, the control circuit 2 includes a voltage-controlled oscillator 21 for which a standard oscillating frequency is defined in advance, for example. This oscillator 21 uses the charge/discharge of a built-in capacitor (not illustrated in the figure) to generate a triangle wave signal in which the voltage repeatedly increases and decreases with a prescribed period as well as a rectangular wave signal that is synchronized with the triangle wave signal, for example. A PWM control comparator 22 compares the voltage of the triangle wave signal output by the oscillator 21 to the voltage $V_{FB}$ of the feedback signal in order to generate a control signal having a pulse width that defines the ON time Ton of the switching element Q.

The multi-stage output circuit 23 that includes the cascade-connected secondary driver circuit Drv-s and the main driver circuit Drv-m generates the main drive signal and the secondary drive signal according to the control signal. The main switching element Q-m is switched ON and OFF using the main drive signal generated by the main driver circuit Drv-m, and the secondary switching element Q-s is switched ON and OFF using the secondary drive signal generated by the secondary driver circuit Drv-s.

As illustrated in FIG. 4, an input voltage Vin generated by full-wave rectifying AC power supplied from a commercial AC power source using diodes D1 and D2 is input to an HV terminal of the control circuit 2. Moreover, as illustrated in FIG. 4, a voltage induced in an auxiliary coil Tc of the transformer T as the switching element Q is switched ON and OFF is passed through a rectifying and smoothing circuit constituted by a diode D3 and a capacitor C3 and then input to a VCC terminal of the control circuit. Furthermore, a current detection voltage CS corresponding to the ON current of the main switching element Q-m which is detected by a shunt resistor Rs provided on the current path formed by the switching element Q is input to a CS terminal of the control circuit 2 along with the feedback signal described above.

In addition, as illustrated in FIG. 3, the control circuit 2 includes a starter circuit 24 that starts the control circuit 2 when a prescribed voltage is applied to the HV terminal and an internal power source 25 that generates a drive voltage required to drive the control circuit 2 from a DC voltage applied to the VCC terminal. The control circuit 2 also includes a UVLO comparator 26 that compares the DC voltage applied to the VCC terminal to a prescribed reference voltage $V_{UVLO}$ in order to prevent malfunctions of the switching power supply due to abnormal decreases in the VCC voltage. The UVLO comparator 26 force-stops operation of the output circuit 23 when an abnormal decrease in the VCC voltage is detected by setting an enable signal sent to the secondary driver circuit Drv-s to OFF.

Furthermore, the control circuit 2 includes an overload detection comparator 27 that compares the voltage $V_{FB}$ of the feedback signal to a prescribed reference voltage $V_{OLP}$ in order to detect overloading of the switching power supply. The control circuit 2 further includes an overcurrent detection comparator 28 that detects overcurrent flowing through the main switching element Q-m from a voltage that occurs across a resistor Rs-m connected in series to the main switching element Q-m and then input to the CS terminal. Moreover, the control circuit 2 includes an overcurrent detection comparator 29 that detects overcurrent flowing through the secondary switching element Q-s from a voltage that occurs across a resistor Rs-s connected in series to the secondary switching element Q-s. The overcurrent detection signals obtained from the comparators 28 and 29 are then input via an OR circuit 30 to an overload detection circuit 31. The overload detection signal detected by the comparator 27 is also input to the overload detection circuit 31.

Meanwhile, the control circuit 2 also includes a frequency reduction circuit 32 that voltage-controls the oscillator 21 according to the voltage $V_{FB}$ of the feedback signal input to an FB terminal at all times (i.e, not only when the overload detection circuit 31 detects overloading) in order to control the oscillating frequency fsw accordingly. The voltage $V_{FB}$ of the feedback signal changes according to the power consumption of the load (that is, the load power), and the larger the load power becomes, the higher the voltage $V_{FB}$ becomes.

The frequency reduction circuit 32 (a switching frequency control unit) reduces the switching frequency fsw at which the main switching element Q-m and the secondary switching element Q-s are switched ON and OFF according to the voltage $V_{FB}$ of the feedback signal, which decreases as the power consumption of the load decreases. More specifically, the switching frequency fsw is reduced according to the voltage $V_{FB}$ of the feedback signal within a range defined by a maximum switching frequency fsw-max (such as 65 kHz) for when a maximum load is applied and a minimum switching frequency fsw-min (such as 25 kHz) for when a minimum load is applied.

Furthermore, when the switching power supply is in normal operation mode, if the power consumption of the load becomes less than a prescribed threshold value while the main switching element Q-m is already being operated using a continuous switching scheme at the minimum switching frequency fsw-min, the frequency reduction circuit 32 reduces the switching frequency of the main switching element Q-m and the secondary switching element Q-s to a value even less than the minimum switching frequency fsw-min in order to put the switching power supply into standby mode (two-stage switching frequency reduction control).

In addition to this switching frequency fsw reduction control feature, the control circuit 2 also includes the above-mentioned enable control circuit 10. When the power consumption of the load decreases to the point at which the switching power supply is put into standby mode, the enable control circuit 10 generates and outputs an enable signal EN that stops the operation of the main driver circuit Drv-m. More specifically, the enable control circuit 10 is implemented as a comparator that compares the voltage $V_{FB}$ of the feedback signal that indicates the load power to the threshold voltage $V_{standby}$, which is used to determine when to transition from normal operation mode to standby mode. The enable control circuit 10 sets the enable signal EN to [H] when the voltage $V_{FB}$ is greater than the threshold voltage $V_{standby}$ and to [L] when the voltage $V_{FB}$ is less than the threshold voltage $V_{standby}$ and then outputs the enable signal EN that was set. This enable signal EN is then used to control the operation of the main driver circuit Drv-m.

As described above, the control circuit 2 controls the switching frequency fsw at which the main switching element Q-m is switched ON and OFF according to the load power. Furthermore, the control circuit 2 makes it possible to stop switching the main switching element Q-m ON and OFF and keep switching just the secondary switching element Q-s ON and OFF when the switching power supply transitions from normal operation mode to standby mode. Here, the MOSFET used for the secondary switching element Q-s has a lower power capacity than the main switching element Q-m and also has a sufficiently low output capacitance Coss and gate charge Qg. Therefore, even if the secondary switching element Q-s is continuously switched during standby mode, the switching loss can be kept less than or equal to a sufficiently small value (such as less than or equal to 10 mW). As a result, the power consumption of the switching power supply in standby mode can be sufficiently reduced by an amount proportional to the reduction in loss in the switching elements (switching loss) in standby mode.

Furthermore, the secondary switching element Q-s can be easily integrated as part of the control circuit 2 which is implemented as a power supply IC. Moreover, the plurality of amplifiers used to form the multi-stage output circuit in the control circuit 2 can easily be used separately for the secondary driver circuit Drv-s and the main driver circuit Drv-m. In addition, the comparator for the enable control circuit 10 can easily be integrated into the control circuit 2. Therefore, the present invention exhibits a wide variety of practically advantageous effects, such as making it possible to provide a simple, low cost switching power supply that effectively reduces switching loss and power consumption in standby mode.

It should be noted that the present invention is not limited to the embodiment described above. For example, the present invention can be used to achieve the same reduction in switching loss in the secondary switching element Q-s even in a switching power supply that utilizes a frequency reduction control scheme while the switching elements are continuously switched and an intermittent burst switching control scheme during standby mode. Furthermore, the present invention ultimately makes it possible to achieve a switching loss that is substantially equal to zero during standby mode (as defined by the International Electrotechnical Commission (IEC), which defines losses of less than 5 mW to be substantially equal to zero). The present invention can also be applied in the same way to configurations in which a plurality of MOSFETs are connected and driven in parallel as the main switching element Q-m in order to achieve the required power capacity rating. In addition, various other modifications may be made without departing from the spirit of the present invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
    a main switching element, configured to be attached to a primary coil of a transformer so as to switch a main current that flows in the primary coil ON and OFF;
    a control circuit that controls switching the main switching element ON and OFF according to an output voltage obtained via a secondary coil of the transformer; and
    a secondary switching element that has a lower power capacity than the main switching element, the secondary switching element being connected in parallel to the main switching element and being switched ON and OFF by the control circuit,
    wherein the control circuit includes:
        a main driver circuit that generates, based upon the output voltage, a main drive signal for switching the main switching element ON and OFF;
        a secondary driver circuit that generates a secondary drive signal for switching the secondary switching element ON and OFF based upon the output voltage; and
        an enable control circuit that activates the main driver circuit when a power consumption of a load to which the output voltage is supplied exceeds a predetermined threshold value and that deactivates the main driver circuit when the power consumption is less than the threshold value, thereby putting the switching power supply into a standby mode.

2. The switching power supply according to claim 1, wherein the secondary driver circuit is arranged upstream of the main driver circuit and constantly generates the secondary drive signal based on a control signal generated from the output voltage, and
    wherein the main driver circuit generates the main drive signal according to the secondary drive signal generated by the secondary driver circuit.

3. The switching power supply according to claim 1, wherein the main switching element is a high power capacity power MOSFET that satisfies a prescribed power capacity, and
    wherein the secondary switching element is a MOSFET with a lower power capacity than the main switching element.

4. The switching power supply according to claim 3, wherein the secondary switching element is integrated into the control circuit.

5. The switching power supply according to claim 1, wherein the control circuit includes a switching frequency control unit that, when the power consumption of the load decreases, reduces a switching frequency at which the main switching element and the secondary switching element are switched ON and OFF from a maximum switching frequency to a minimum switching frequency in accordance with the decrease in the power consumption of the load, and
    wherein when the power consumption of the load becomes less than the threshold value while the main switching element is being continuously switched at the minimum switching frequency, the switching frequency control unit further reduces the switching frequency of the secondary switching element to a value less than the minimum switching frequency.

6. The switching power supply according to claim 1, wherein the control circuit includes:
    a switching frequency control unit that, when the power consumption of the load decreases, reduces a switching frequency at which the main switching element and the secondary switching element are switched ON and OFF from a maximum switching frequency to a minimum switching frequency in accordance with the decrease in the power consumption of the load; and
    a burst drive control unit that starts driving the secondary switching element using a burst switching scheme at a prescribed burst frequency when the power consumption of the load becomes less than the threshold value while the main switching element is being continuously switched at the minimum switching frequency.

7. The switching power supply according to claim 1, wherein the secondary driver circuit is constantly active, and
    wherein the enable control circuit activates the main driver circuit by forwarding an enable signal to the main driver circuit.

* * * * *